Oct. 13, 1936.  A. GEORGIEV  2,057,094
ELECTROLYTIC CONDENSER
Filed Jan. 8, 1930

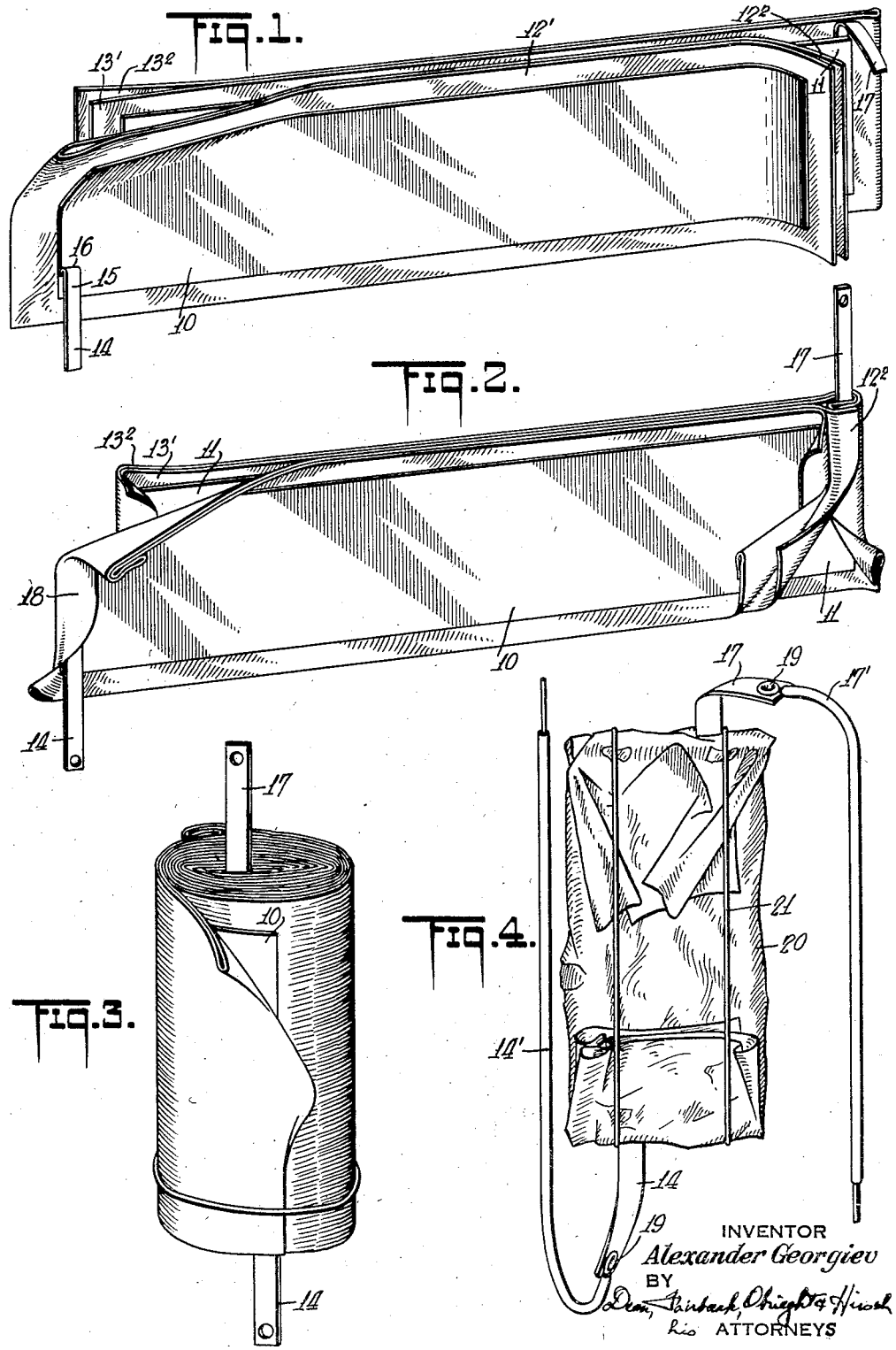

INVENTOR
*Alexander Georgiev*
BY
his ATTORNEYS

Patented Oct. 13, 1936

2,057,094

UNITED STATES PATENT OFFICE 2,057,094

ELECTROLYTIC CONDENSER

Alexander Georgiev, Brooklyn, N. Y., assignor to Aerovox Corporation, a corporation of New York Application January 8, 1930, Serial No. 419,232

4 Claims. (Cl. 175—315)

My present invention relates to electrical condensers of the electrolytic type, that is, of the type in which the dielectric is formed in a thin film by oxidation or other electro-chemical action upon the surface of the anode or the positive conductive element of the condenser.

It is an object of the invention to provide an essentially dry condenser of the above type, of stable and dependable character, affording high capacity in small bulk, of negligible leakage, and which may be used in certain filter circuits and power supply units of radio receiving sets, without likelihood of breakdown.

Another object is to provide a simple, practical, inexpensive and expeditious method of producing a condenser of the above type.

Figure 5:
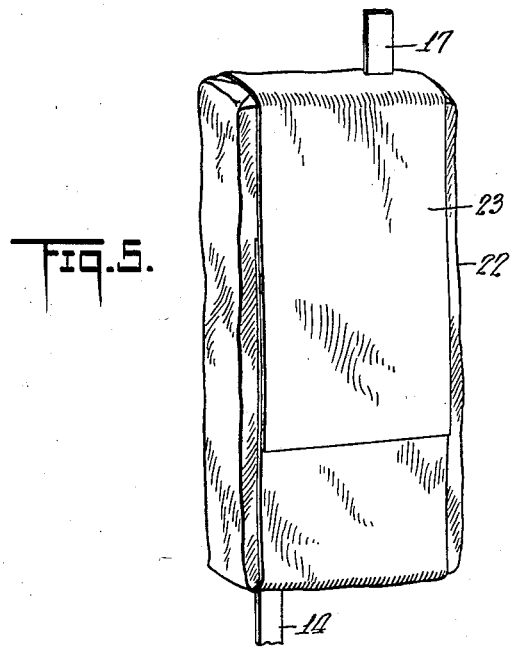
Figure 6:
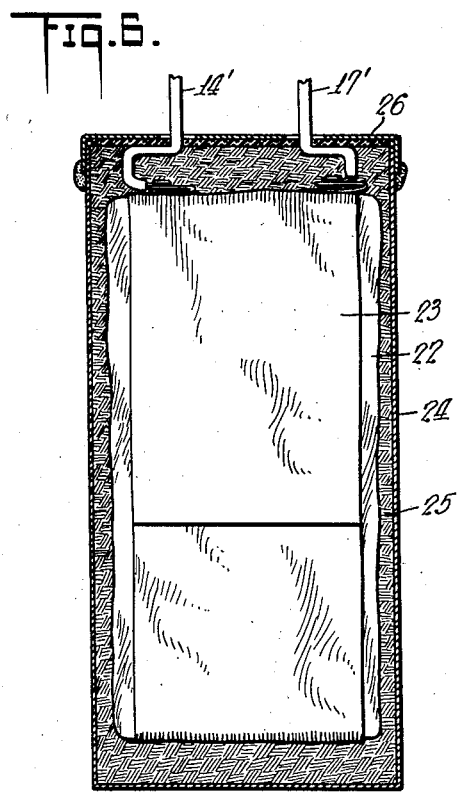
Figure 7:
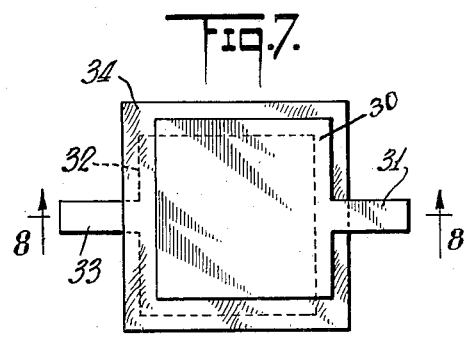
Figure 8:
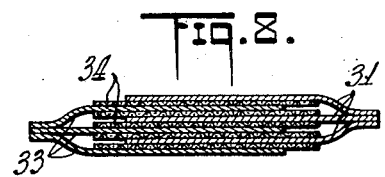

In the accompanying drawings in which is shown one of various possible embodiments of the several features of the invention, Fig. 1 is a perspective view showing the constituent elements of the condenser prior to winding, Fig. 2 is a perspective view showing the condenser partly wound, Fig. 3 is a view showing the condenser completely wound, Fig. 4 is a view similar to Fig. 3 showing the condenser in its inner wrapping, Fig. 5 is a view similar to Fig. 4 showing the condenser in its outer wrapping, Fig. 6 is a view in longitudinal cross-section of the completed condenser, Fig. 7 is a perspective view showing a plate type condenser according to the above construction, and Fig. 8 is a view in transverse section through the condenser of Fig. 7, and along lines 8—8 thereof.

Referring now to Fig. 1 of the drawings, the condenser is made preferably of a pair of armature foils, 10 and 11, of suitable film forming metal preferably aluminum, with an absorbent separator, which may comprise a pair of interposed sheets 12' and 12², preferably of woven fabric, of width and of length greater than those of the foils. An additional double sheet of woven fabric 13' and 13² is superposed over foil 11.

As shown on the drawings, the foils or armatures are laterally displaced with respect to each other, preferably by a distance in the order of one-quarter inch more or less, and the ends of the sheets are spaced from each other or overlap by a distance of two inches more or less as shown. The foils 10 and 11 are thus longitudinally displaced so that the end of one foil such as foil 10 overlaps the adjacent end of foil 11, while the opposite end of foil 11 overlaps the other end of foil 10 and thus the various edges of the foils are displaced with respect to each other. The armature foil 10 is provided with a terminal tab 14 preferably formed by slitting the foil transversely near one end for nearly the entire width thereof, to provide a tongue 15, which is turned over and reversely bent as at 16, so that tab 14 may protrude beyond one end of the condenser roll. The foil 11 is similarly provided with a similar terminal tab 17, preferably at the other end, cut from the opposite longitudinal edge to protrude from the opposite end of the condenser roll.

The fabrics preferably project beyond the ends of the foils and are folded thereover as indicated at 18 and the lateral edges thereof overlap both lateral edges of each of the foils. This latter expedient, while it affords a measure of protection against arcing over at corners or edges, has been found unsatisfactory for high voltage condensers, and other expedients more fully discussed below, are primarily relied on for this purpose.

The superposed layers of foil and fabric are wound together to provide a flattened roll with the terminal tabs 14 and 17 of the two foil ends protruding from opposite ends of the roll.

While immersed in a suitable electrolyte, electric current is applied through terminals 14 and 17 of the individual condenser rolls, to apply across the condenser, direct current, of voltage preferably about 25 per cent higher than that to which the condenser is to be subjected in actual use. During the forming operation, circulation of the electrolyte within the forming tank tends to remove any foreign particles that might otherwise adhere to the foil and contributes to uniformity of result. The condensers being submerged in the electrolyte tank during forming, there is avoided the disturbing effect frequently incurred when the forming is conducted in air, and my formed product when removed from the tank has a homogeneous oxide coating of uniform dielectric strength and with high dielectric constant. As there is no winding or bending and little handling of the condenser body to be done after the forming, the danger of cracking or otherwise damaging the thin dielectric film is eliminated.

After the condenser has thus been formed, it is provided with terminal wires or leads 14' and 17', preferably attached to the free ends of the respective terminal tabs 14 and 17 by hollow rivets 19. Thereupon, the condenser is preferably wrapped in leak-proof paper 20 which may be held in position by rubber bands 21. The entire assembly is then wrapped in strong wrapping paper 22 secured by adhesive sealing strips 23, with the terminal leads 14 and 17 protruding from the wrapper. The condenser is then inserted into a can 24 of dimensions but little larger than that of the condenser, which can is filled with paraffin or other insulating compound 25 and the cover 26 is soldered in place with the free ends of the terminal leads 14' and 17' protruding therethrough.

The likelihood of short circuit leakage or break-down of the condenser due to arcing between adjacent edges, corners or other sharp regions of opposite polarity, is greatly minimized, since these portions according to my invention, are spaced from each other by a distance far greater than the arcing gap for the voltages of use. Yet the non-alignment of the cathode and anode foils 10 and 11, does not in any way diminish the active area of the condenser, as it would in condensers of other types, for, the entire effective area of the foils remains useful despite such non-alignment, since the dielectric film effectively coats the entire area of the anode plate, and is, in turn, covered throughout its area by the fabric sheets 12' and 13', which being impregnated with the electrolytic solution, serves as cathode. Even though left idle for a long time (weeks or months) the dielectric film of my condenser remains substantially intact. When after such a period of idleness the full rated voltage is applied to the condenser terminals, normal operation ensues promptly.

In the embodiment of Figs. 7 and 8, the same non-alignment principle is shown applied to a condenser of the plate type. The arrangement will be immediately apparent from the drawings but it may be briefly noted that each of the cathode plates 30, for instance, has a terminal tab 31 unitary therewith, protruding from one edge and each of the anode plates 32, has a similar tab 33 protruding from the opposite edge thereof. The cathode and the anode plates are staggered relative to each other, both in a longitudinal direction and in a transverse direction, as shown. The intervening fabric sheets 34 that carry the impregnating medium are of area larger than the armatures and protrude beyond the respective armature edges, both along their longitudinal and along their transverse edges. The mode of assembling, forming and completing the plate type electrolytic condenser just described, will be apparent from the foregoing description of the roll type.

While I prefer to misalign or stagger the foils or plates respectively, and to conduct the forming operation within the electrolytic tank, the scope of my invention embraces the use of any one or any two of these features and their equivalents, in the absence of the others or other respectively, all as pointed out in the accompanying claims.

It will thus be seen that there is herein described apparatus and a method in which the several features of this invention are embodied, and which apparatus and method in its action attains the various objects of the invention and is well suited to meet the requirements of practical use.

As many changes could be made in the above method and construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent of the United States is:—

1. An electrolytic condenser comprising a pair of armature foils, an intervening absorbent sheet, the opposite extremities of said armature foils being slit parallel to corresponding edges thereof, said slit portions bent over to form protruding terminal tabs, said foils and intervening sheet rolled together, a wrapping of leak-proof paper enclosing said condenser roll, and a heavier covering enclosing said leak-proof wrapped condenser.

2. An electrical condenser comprising a pair of metal foils, said foils being laterally displaced relative to each other so that their longitudinal edges do not coincide, one foil overlapping the other at one end, the other foil overlapping said one foil at the opposite end, terminal tabs on the overlapping ends of said foils and separator sheets overlying each foil and extending beyond the ends and sides thereof, said sheets being folded at their ends over the ends of the foils bearing said tabs.

3. An electrolytic condenser comprising an active capacity producing unit, including cathode and anode foils, intervening porous means contacting said foils and having film-forming electrolyte absorbed therein, a leak-tight wrapper enclosing said unit, a paper wrapper enclosing said leak-tight wrapper, said unit having terminal leads protruding through said wrappers, a can enclosing said enwrapped unit, and a filler hard at normal temperatures occupying the space about said unit within said can.

4. An electrolytic condenser comprising elongated cathode and anode foils, a fabric layer intervening between said foils of width and length greater than the same, a fabric layer superposed over one of said foils and of width and length greater than same, the protruding ends of the fabric layers folded over the respective ends of the foils, said foils and layers enrolled and having terminal tabs protruding therebeyond, film-forming electrolyte absorbed in said fabric layers, liquid-tight wrapper means enclosing said enrolled unit, a container enclosing the enwrapped unit, and filler means hardened in position about said enwrapped unit and within said container, said wrapper preventing injury to the enclosed unit by the filler while hot.

ALEXANDER GEORGIEV.